United States Patent [19]
Andrews

[11] Patent Number: 5,217,137
[45] Date of Patent: Jun. 8, 1993

[54] SEAL FOR AN END CAP

[75] Inventor: Christopher J. Andrews, New London, N.H.

[73] Assignee: Freudenberg-NOK General Partnership, Plymouth, Mich.

[21] Appl. No.: 689,184

[22] Filed: Apr. 22, 1991

[51] Int. Cl.⁵ .............................. B65D 83/10
[52] U.S. Cl. .................... 220/366; 277/29; 384/484
[58] Field of Search ............... 220/366; 215/307, 343; 277/29; 384/484

[56] References Cited

U.S. PATENT DOCUMENTS

| | | |
|---|---|---|
| 1,654,474 | 12/1927 | Wolter .................... 220/366 X |
| 1,658,774 | 2/1928 | Taub ....................... 220/366 X |
| 1,987,869 | 1/1935 | Reichenbach ............. 220/366 |
| 2,851,315 | 9/1958 | Zavoda . |
| 3,061,139 | 10/1962 | Edwards . |
| 3,285,461 | 11/1966 | Santelli ................... 220/366 X |
| 3,339,786 | 9/1967 | Biglin . |
| 3,362,565 | 1/1968 | McCormick . |
| 3,381,872 | 5/1968 | Holder et al. . |
| 3,393,015 | 7/1968 | Kaufman .................... 277/29 X |
| 3,460,874 | 8/1969 | Johnson . |
| 3,613,938 | 10/1971 | Westcott . |
| 3,858,950 | 1/1975 | Otto . |
| 4,315,578 | 2/1982 | Ludwig, Jr. ................ 220/366 |
| 4,337,875 | 7/1982 | Lyons .................... 220/368 |
| 4,368,933 | 1/1983 | Motsch . |
| 4,756,433 | 7/1988 | Lin ........................ 215/6 |
| 4,760,936 | 8/1988 | Mueller . |
| 4,971,219 | 11/1990 | Dombeck et al. .......... 220/303 |

Primary Examiner—Allan N. Shoap
Assistant Examiner—Nova Stucker
Attorney, Agent, or Firm—Dinnin & Dunn

[57] ABSTRACT

The present invention is a seal for an open end of an end cap which is adapted to be at least partially disposed in a cavity of a member. The seal includes an axial portion adapted to extend axially along an axial flange forming the open end of the end cap. The seal also includes at least one relief extending axially along the axial portion for allowing gaseous fluid to communicate between the cavity of the member and atmosphere.

10 Claims, 1 Drawing Sheet

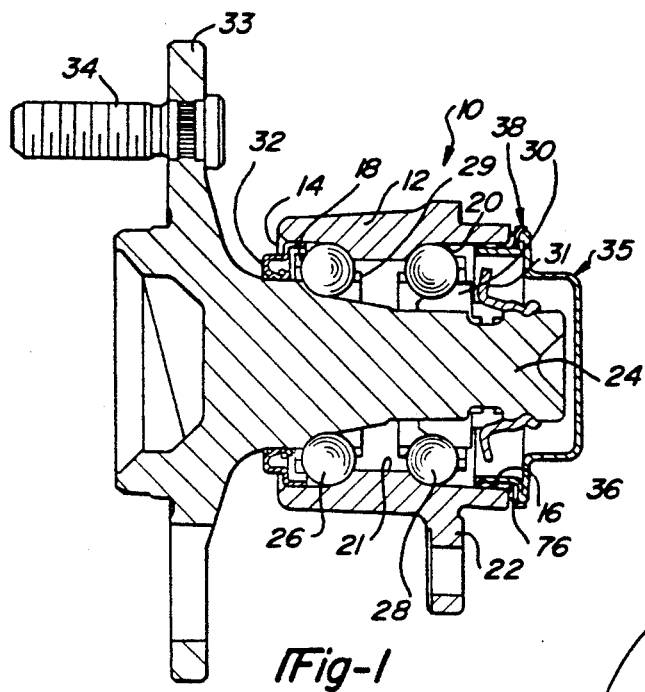
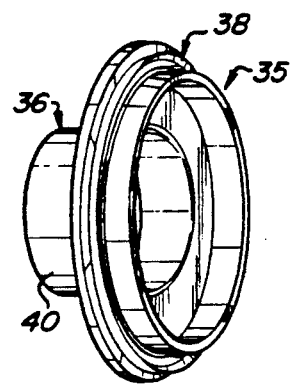
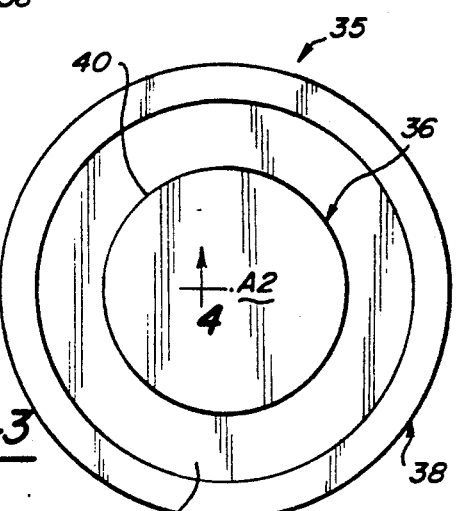
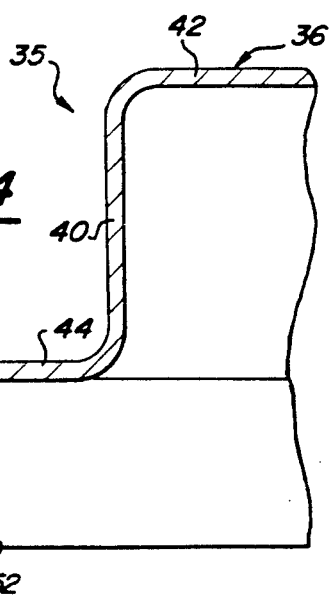
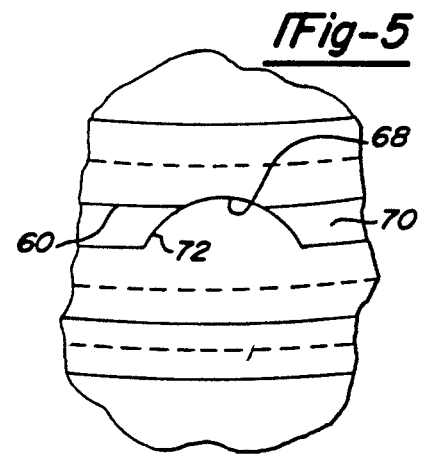

SEAL FOR AN END CAP

BACKGROUND OF THE INVENTION

1. Field of the Invention

The present invention relates generally to seals, and more particularly to, a seal for an end cap of a bearing assembly.

2. Description of Related Art

Rotating members such as wheel spindles commonly have a bearing assembly around one end thereof to allow the spindles to rotate relative to a fixed member. Typically, a housing such as an end cap is placed over an opening in one end of the bearing assembly to protect the bearing assembly from foreign contaminants and contain lubricant.

At the assembly of a totally sealed bearing assembly, a fixed volume of air is captured inside a cavity of the bearing assembly. The assembly operation seals the bearing assembly before the designed volume is achieved. Therefore, this reduction in volume results in an increase in internal pressure. During the intended use of the bearing assembly, application of load and introduction of relative motion between the rotating members and the inner and outer rolling elements cause gases to volatilize from bearing lubricant and expand due to the change in temperature. The result is an increase in internal pressure of the bearing assembly. In such conditions, a conventional end cap will retain this increased pressure. As a result, two failure modes can be induced: first, the internal pressure may develop to such an extent that the end cap or an opposed dynamic sealing element may be forced from a counterbore position exposing the rotating members and rolling elements directly to exterior contaminants; and second, the increase in internal pressure can cause an increase in the radial load exerted on the rotating members by the dynamic sealing element. This typically causes an increase in power consumption and eventually leads to premature wear of the dynamic sealing element and failure. Failure in the dynamic sealing element results in a loss of lubricant and ingress of contaminants leading to total bearing failure. Furthermore, a bearing assembly that has reached an elevated temperature condition due to routine service will draw a slight vacuum and ingest contaminants if cooled quickly due to a sudden change in environment. Therefore, a need exists for an element which would vent positive pressure and prevent equalization of a negative pressure resulting in ingestion of contaminants.

Solutions to relieve this condition usually require a dynamic sealing element for the bearing assembly to vent across the dynamic sealing interface. This compromises the effectiveness of the dynamic sealing element.

SUMMARY OF THE INVENTION

It is, therefore, one object of the present invention to provide a seal for an end cap which allows excess pressure within the bearing assembly to bleed off.

It is another object of the present invention to provide a seal for an end cap that can be optimized to provide pressure relief at a desired pressure.

It is yet another object of the present invention to provide a seal for an end cap having improved seal retention and pressure relief to prevent the end cap from being blown off the end of the bearing assembly.

It is also another object of the present invention to provide a permanent barrier to ingress of contaminants due to a negative pressure differential.

It is still another object of the present invention to provide a new and improved end cap assembly for a bearing assembly.

It is a further object of the present invention to provide an end cap assembly which is lower in cost.

To achieve the foregoing objects, the present invention is a seal for an open end of an end cap which is adapted to be at least partially disposed in a cavity of a member. The seal includes an axial portion adapted to extend axially along an axial flange forming the open end of the end cap. The seal also includes means having at least one relief extending axially along the axial portion for allowing gaseous fluid to communicate between the cavity of the member and atmosphere.

One advantage of the present invention is that the seal for the end cap allows excess pressure within the bearing assembly to bleed off and reach equilibrium. Another advantage of the present invention is that the seal provides seal retention and gas flow relief, thereby preventing the end cap from being blown off the end of the bearing assembly. Yet another advantage of the present invention is that the seal can be optimized to provide pressure relief at a desired pressure. Still another advantage of the present invention is that the seal prevents contaminants from ingressing the end cap due to a negative pressure differential. A further advantage of the present invention is that the seal is lower in cost than conventional pressure relief structure for end caps.

Other objects, features and advantages of the present invention will be readily appreciated as the same becomes better understood by those skilled in the art after reading the following description in light of the accompanying drawings.

BRIEF DESCRIPTION OF THE DRAWINGS

FIG. 1 is a fragmentary elevational view of a bearing assembly incorporating an end cap assembly according to the present invention.

FIG. 2 is a perspective view of the end cap assembly of FIG. 1.

FIG. 3 is an elevational view of the end cap assembly of FIGS. 1 and 2.

FIG. 4 is a sectional view taken along line 4—4 of FIG. 3.

FIG. 5 is a bottom view of a portion of the end cap assembly of FIGS. 1 and 2.

DESCRIPTION OF THE PREFERRED EMBODIMENT(S)

Referring to FIG. 1, a bearing assembly 10 is shown which is adapted for use in a wheel assembly (not shown) of an automotive vehicle (not shown). The bearing assembly 10 includes a fixed member such as a wheel hub or outer bearing race 12. The wheel hub 12 is generally cylindrical in shape and extends axially to inner cavity or and outer open ends 14 and 16. The wheel hub 12 has an inner pocket 18 extending axially inwardly from the inner open end 14 and an outer cavity or pocket 20 extending axially inwardly from the outer open end 16. The wheel hub 12 also has a passageway 21 extending axially and communicating with the inner and outer pockets 18 and 20. The wheel hub 12 further has a flange 22 extending radially outwardly and is adapted for connection by suitable means such as fasteners (not shown) to the automotive vehicle. It should be appreciated that the wheel hub 12 is fixed to a non-rotating portion of the automotive vehicle.

The bearing assembly 10 also includes a spindle or inner bearing race 24. The spindle 24 is generally cylindrical in shape and extends axially. The wheel hub 12 is disposed about the spindle 24 and spaced radially therefrom. The bearing assembly 10 further includes inner and outer rolling elements 26 and 28, respectively, disposed between the spindle 24 and wheel hub 12. The inner and outer rolling elements 26 and 28 comprise a plurality of balls or rollers spaced circumferentially by a cage 29. The inner rolling element 26 is seated in inner pocket 18 against the spindle 24 and wheel hub 12. The outer rolling element 28 is seated in outer pocket 20 against the wheel hub 12 and a bearing seat 30 disposed about the spindle 24. A keeper 31 is disposed about the spindle 24 and engaged therewith to prevent axial movement of the bearing seat 30. The inner and outer rolling elements 26 and 28 allow the spindle 24 to rotate relative to the wheel hub 12.

The bearing assembly 12 also includes a dynamic seal member 32 disposed in the inner open end 14 between the wheel hub 12 and spindle 24 to seal the inner pocket 18 and inner rolling element 26 from contaminants and retain lubricants. The seal member 32 is conventional and known in the art. The spindle 24 includes an end plate 33 extending radially outwardly. The end plate 33 is adapted for connection by suitable means such as fasteners 34 to a rotatable member such as a tire rim (not shown) of the automotive vehicle. It should be appreciated that the inner and outer pockets 18 and 20 communicate with each other via passageway 21.

An end cap assembly, generally indicated at 35 and according to the present invention, is adapted to close the outer open end 16 and prevent contaminants from entering the outer pocket 20 and outer rolling element 28. As illustrated in FIGS. 1 through 4, the end cap assembly 35 includes an end cap, generally indicated at 36, and a seal, generally indicated at 38. The end cap 36 has a generally cylindrical and axially extending body wall 40 with one end closed by a generally radially extending end wall 42. The end cap 36 also has an outer flange 44 extending radially outwardly from the other end of the body wall 40. The end cap 36 further has an inner flange 46 extending radially inwardly from the free end of the outer flange 44 and forming a generally arcuate radial end portion 48. The end cap 36 includes an end flange 50 extending axially from the inner flange 46. The end flange 50 is generally cylindrical in shape and forms an open end 52 of the end cap 36. The end cap 36 is made of a metal material such as steel. It should be appreciated that the end cap 36 may be made of other suitable materials such as plastic.

The seal 38 is adapted to be disposed about the outer periphery of the open end 50 of the end cap 36. The seal 38 includes a radial portion 54 extending along the inner flange 46. The seal 38 also includes a gripping portion 56 at the radial end of the radial portion 54. The gripping portion 56 includes a gripping surface 58 which is generally arcuate in shape. The gripping portion 56 is adapted to extend about the radial end portion 48 such that the gripping surface 58 conforms to the outer surface of the radial end portion 48. The seal 38 further includes an axial portion 60 extending axially along the end flange 50 from the inner radial end of the radial portion 54. The axial portion 60 has reduced diameter end portions 62 and 64 at each axial end. The axial portion 60 also has a flange portion 66 adapted to extend over the end of the end flange 50. The axial portion 60 further has at least one relief or groove 68 extending axially along and radially inwardly between reduced end portions 62 and 64 to allow gaseous fluid such as air to communicate between the interior of the wheel hub 12 and atmosphere. In the preferred embodiment, six (6) grooves 68 are circumferentially spaced about the axial portion 60.

The seal 38 includes a bumper or stop 70 extending radially and axially from the juncture of the radial and axial portions 54 and 60. The bumper 70 is adapted to limit installation of the end cap assembly 35 into the outer pocket 20. The bumper 70 extends circumferentially and is interrupted by an enlarged portion 72 of the groove 68.

The seal 38 also includes a sealing lip 74 extending outwardly and axially from the radial portion 54 at an angle. The sealing lip 74 is adapted to contact an end face 76 (FIG. 1) of the wheel hub 12. The seal 38 is made of an elastomeric material such as ethylene acrylic or nitrite rubber. In one embodiment, the elastomeric material may be ethylene acrylic having a durometer of $80 \pm 5$ (Shore A). The seal 38 may be secured to the end cap 36 by a chemically bonded adhesive applied by conventional means.

In operation, the end cap assembly 35 is moved toward the outer open end 16 of the wheel hub 12. The end flange 50 and axial portion 60 are disposed in the outer pocket 20 until the movement is stopped by the bumper 70 contacting the end face 76 of the wheel hub 12. The axial portion 60 engages the interior surface of the wheel hub 12 by an interference fit and retains or secures the end cap assembly 35 to the wheel hub 12. The sealing lip 74 engages the end face 76 to provide an effective seal against contaminants. During operation, excess pressure builds within the bearing assembly 10 as previously described. The excess pressure causes gaseous fluid to flow through the grooves 68 and enlarged portion 72. At a predetermined pressure, the gaseous fluid lifts the sealing lip 74 to bleed off or exit the excess pressure from the bearing assembly 10 to atmosphere. If the bearing assembly 10 is cooled quickly, a vacuum may arise within the bearing assembly 10. The vacuum causes the sealing lip 74 to contact or engage the end force 76 of the wheel hub 12 and prevent the ingress of contaminants. It should be appreciated that, by changing the length of the sealing lip 74, depth and width of grooves 68 and/or height of the bumper 70, the seal 38 may be optimized to provide pressure relief at various desired or predetermined pressures.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. An end cap assembly adapted to be at least partially disposed in a cavity of a hub member, comprising:
    an end cap having means forming an open end adapted to be disposed within the cavity of the hub member, said end cap including an axial flange forming an opening at said open end and a radial flange extending from one end of said axial flange; and a separate seal member secured to and disposed about an outer periphery of said axial flange of said end cap and forming a seal opening corresponding to said opening at said open end, said seal including relief means for allowing gaseous fluid to communicate between the cavity of the hub member and atmosphere.

2. An end cap assembly as set forth in claim 1 wherein said seal includes means for limiting axial movement of said end cap within the cavity of the hub member.

3. An end cap assembly as set forth in claim 1 wherein said seal includes lip means for sealing against the hub member.

4. An end cap assembly as set forth in claim 1 wherein said seal comprises a radial portion extending along said radial flange and an axial portion extending from said radial portion and axially along said axial flange.

5. An end cap assembly as set forth in claim 4 wherein said relief means comprises at least one groove extending axially and radially inwardly along said axial portion.

6. An end cap assembly adapted to be at least partially disposed in a cavity of a hub member, comprising:
   an end cap having means forming an open end adapted to be disposed within the cavity of the hub member; and
   a seal disposed about a periphery of said open end of said end cap, said seal including relief means for allowing gaseous fluid to communicate between the cavity of the hub member and atmosphere;
   said end cap comprising an axial flange forming said open end and a radial flange extending from one end of said axial flange;
   said seal comprising a radial portion extending along said radial flange and an axial portion extending from said radial portion and axially along said axial flange; and
   including a seal lip extending from said radial portion axially and outwardly at an angle and adapted to contact the hub member.

7. An end cap assembly adapted to be at least partially disposed in a cavity of a hub member, comprising:
   an end cap having means forming an open end adapted to be disposed within the cavity of the hub member; and
   a seal disposed about a periphery of said open end of said end cap, said seal including relief means for allowing gaseous fluid to communicate between the cavity of the hub member and atmosphere;
   said end cap comprising an axial flange forming said open end and a radial flange extending from one end of said axial flange;
   said seal comprising a radial portion extending along said radial flange and an axial portion extending from said radial portion and axially along said axial flange; and
   including a step portion extending axially and circumferentially from said radial portion.

8. An end cap assembly adapted to be at least partially disposed in a cavity of a hub member, comprising:
   an end cap having means forming an open end adapted to be disposed within the cavity of the hub member; and
   a seal disposed about a periphery of said open end of said end cap, said seal including relief means for allowing gaseous fluid to communicate between the cavity of the hub member and atmosphere;
   said end cap comprising an axial flange forming said open end and a radial flange extending from one end of said axial flange;
   said seal comprising a radial portion extending along said radial flange and an axial portion extending from said radial portion and axially along said axial flange;
   wherein said seal includes an inner portion at one end of said axial portion and extending circumferentially inwardly and adapted to abut a free end of said axial flange and a gripping portion extending axially from a free end of said radial portion and adapted to be disposed about the free end of said radial flange.

9. An end cap assembly as set forth in claim 8 wherein said end cap further comprises an end wall, an axial wall extending axially and circumferentially from said end wall, and a radial wall at a free end of said axial wall, said axial wall and said end wall forming a pocket.

10. An end cap assembly adapted to be at least partially disposed in a cavity of a bearing assembly, comprising;
    an end cap having means forming an open end adapted to be disposed within the cavity of the bearing assembly;
    a seal disposed about a periphery of said open end of said end cap, said seal including at least one relief for allowing gaseous fluid to communicate between the cavity of the bearing assembly and atmosphere;
    said seal including a bumper for limiting axial movement of said end cap within the cavity of the bearing assembly;
    said end cap comprising an axial flange forming said open end and a radial flange extending from one end of said axial flange;
    said seal comprising a radial portion extending along said radial flange and an axial portion extending from said radial portion and axially along said axial flange; and
    said at least one relief comprising at least one groove extending axially and radially inwardly along said axial portion.

* * * * *